April 10, 1956 — H. O. HARTZNER — 2,741,195
PORTABLE AWNING FOR TRAILERS
Filed Oct. 11, 1954 — 2 Sheets-Sheet 1

INVENTOR.
Harry O. Hartzner

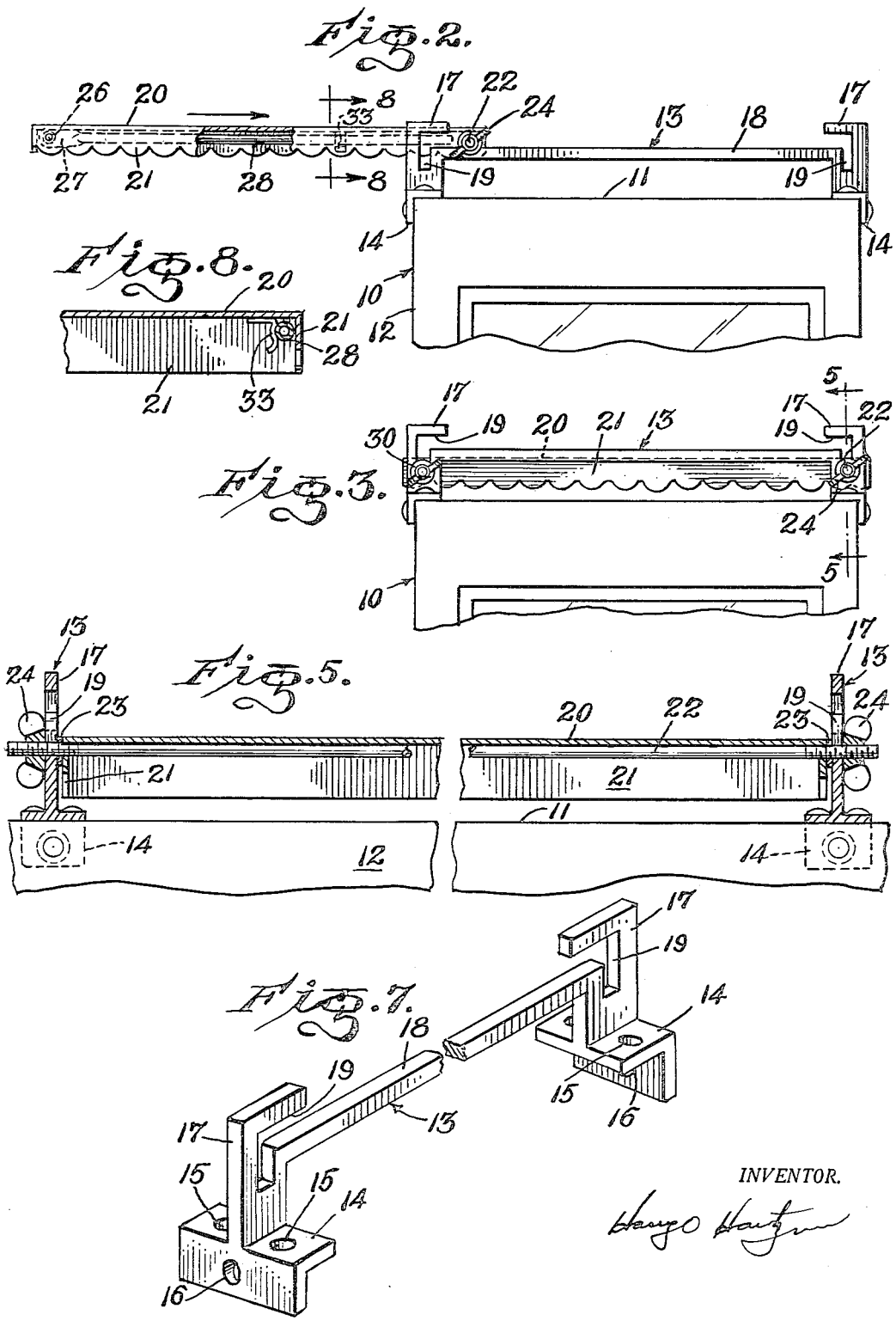

United States Patent Office 2,741,195
Patented Apr. 10, 1956

2,741,195

PORTABLE AWNING FOR TRAILERS

Harry O. Hartzner, Akron, Ohio

Application October 11, 1954, Serial No. 461,581

3 Claims. (Cl. 108—2)

This invention relates to awnings for trailers, or the like.

At the present time there are two types of awnings for trailers on the market. The first type is made up of sections and has to be taken apart completely and stored either in the trailer while moving or on a special rack provided on the top of the trailer, this construction presenting obvious disadvantages. The second type folds downwardly against the sides of the trailer when moving, but has to be opened up to permit the owner to enter the trailer and suffers from the disadvantage of having to be in the up position at all times while living in the trailer.

It is accordingly a principal object of the present invention to provide an improved portable awning for trailers which, when the trailer is parked, may be in either an up or down position, as desired.

It is another object of the present invention to provide a trailer for awnings which may be raised or lowered with a minimum of effort in a matter of minutes.

It is still another object of the present invention to provide an awning for trailers which can be manufactured of a sturdier construction due to the fact that it never has to be taken apart.

Other objects of the present invention are to provide a portable awning for trailers bearing the above objects in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which:

Fig. 2 is a side elevational view thereof showing the awning with the supporting posts collapsed therewithin and in an intermediate position as it is moved into a closed position across the top of the trailer;

Fig. 3 is a view similar to Fig. 2 but showing the awning in the completely closed position;

Fig. 5 is a vertical sectional view taken along the line 5—5 of Fig. 3;

Fig. 7 is a perspective view of one of the frame members, shown alone; and

Fig. 8 is a fragmentary section taken on the line 8—8 of Fig. 2.

Figure 1:
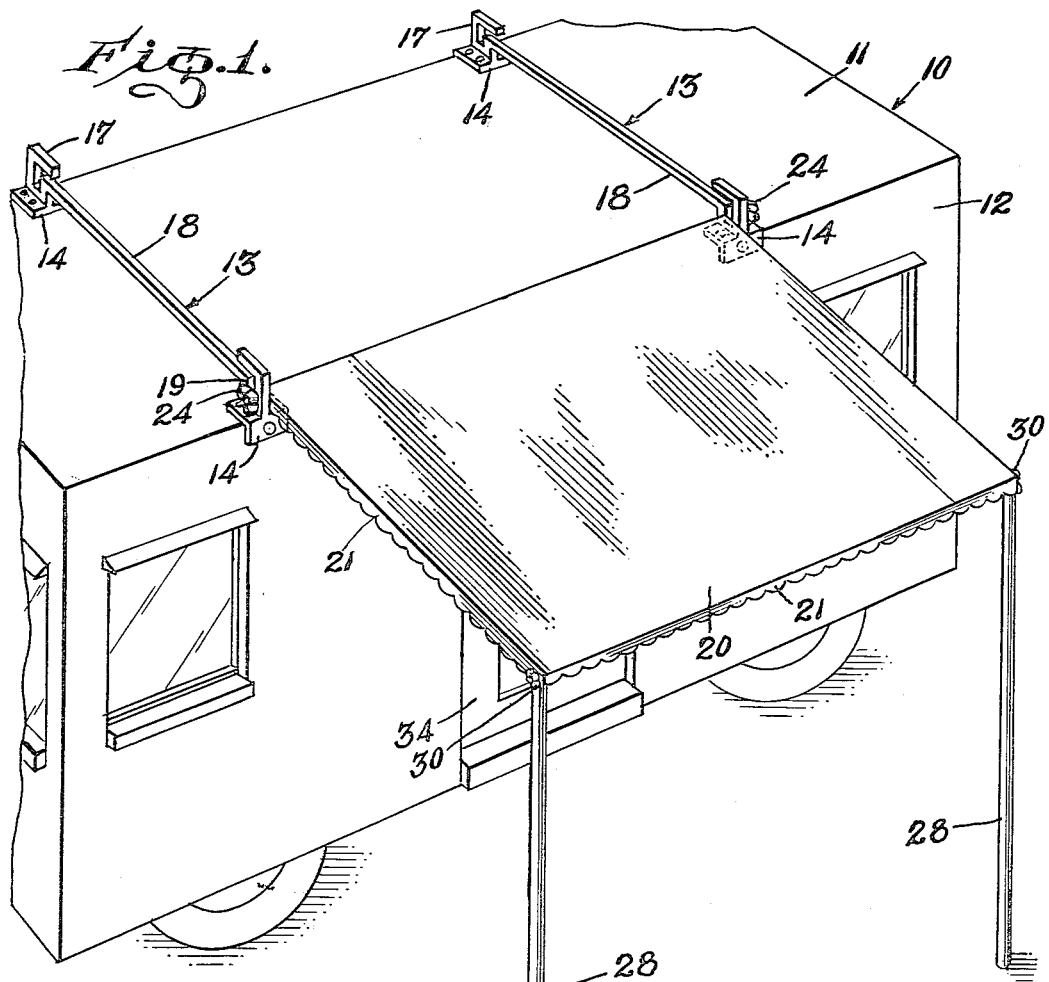
Figure 1 is a perspective view showing a preferred embodiment of the present invention in operative use on a trailer.
Figure 4:
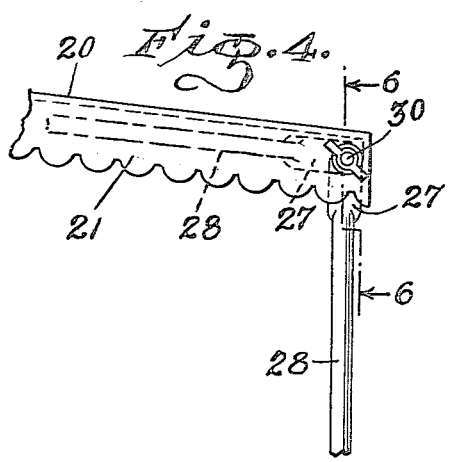
Fig. 4 is an enlarged fragmentary side elevational view of the outer end of the awning when in the open position and showing in phantom the collapsed position of the posts.

Referring now more in detail to the drawing, 10 indicates generally a trailer having a roof 11 and side walls 12, substantially as illustrated.

In the practice of my invention, an improved portable awning is provided for the trailer 10 and includes a pair of frame members of aluminum or other suitable material indicated generally at 13 (Fig. 7). The frame 13 includes a pair of angle brackets 14 having the mounting openings 15 for securing the brackets to the roof 11 and the mounting openings 16 for securing the brackets to the sides 12, as will be obvious. Vertical standards 17 are integrally formed at the centers of the brackets 14 and are connected by the bar 18 integral therewith, the standard 17 above the bar 18 being provided with L-shaped slots 19 for a purpose which will hereinafter become clear.

An aluminum awning is provided and comprises the rectangular sheet 20 integrally formed around its periphery with the depending, scalloped flanges.

There is shown in Fig. 5 the side flanges 21 of the awning near their rear end which are provided with aligned openings which receive therethrough the opposite externally threaded ends of a transverse rod 22, the ends of the rod 22 being slidably received within the L-shaped slots 19. Washers 23 are provided on the rod 22 intermediate the side flanges 21 and the frame members 13. Wing nuts 24 are screwed onto the ends of the rod 22 and engage the face of the frame member 13 whereby to lock the awning in the position of Fig. 1 or Fig. 3.

Figure 6:
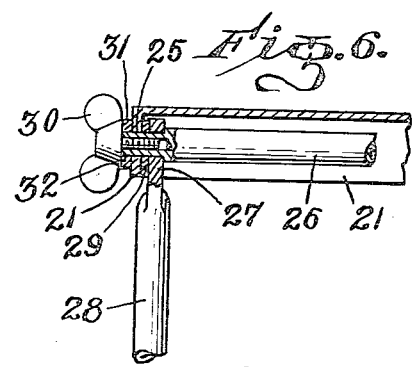
Fig. 6 is a vertical sectional view taken along the line 6—6 of Fig. 4.

As shown in Fig. 6, the side flanges 21 at their forward end are provided with aligned openings receiving therethrough the internally threaded extensions 25 formed at each end of the second rod 26, the extensions 25 being of less diameter than the rod 26 and providing a shoulder which abuts the flat upper end 27 of a post 28 rotatably mounted on the extension 25 on the inner face of the side flanges 21, the washer 29 being provided on the extension 25 intermediate the flat portion 27 and the flange 21. The posts 28 are locked relative to the awning 20 by means of wing nuts 30 having externally thread shanks 31 which are screwed into the internally threaded extensions 25, a washer 32 being provided on the extension 25 intermediate the flange 21 and wing nut 30. Thus, the outer end of the awning 20 may be supported by the posts 28, as shown in Fig. 1.

The posts 28, rods 26 and 22 as well as the awning 20 will preferably be formed of aluminum.

As shown in Fig. 8, spring clips 33 are mounted on the undersurface of the awning 20 adjacent the side flanges 21 and are adapted to resiliently retain the posts 28 when rotated to their inoperative position within the flanges 21 upon loosening of the wing nuts 30 (Fig. 2). The wing nuts 30 will be removed to permit the upward rotation of the posts 28 and the inward longitudinal movement of the awning 20 along the rods 18 until the ends of the rod 22 are received within the rearmost L-shaped slot 19 (Fig. 3), at which point the extensions 25 of the rod 26 will drop downwardly into the bottom of the forwardmost L-shaped slot 19. The awning will be locked in this collapsed position on top of the trailer by tightening the wing nuts 24 and 30, as will be obvious.

As shown in Fig. 1, access to the door 34 may be had when the awning is in the open position as well as when it is in the closed position of Fig. 3. It will also be readily apparent that the device may be collapsed in a matter of minutes and as easily and readily set up and that it does not have to be taken apart at any time. The awning is preferably formed of aluminum and may be provided with reinforcing ribs or channels for greater strength. It may be made in various lengths but the widths would have to be within the legal requirements for trailers.

While various changes may be made in the detail construction, it shall be understood that such changes shall be within the spirit and scope of the present invention as defined by the appended claims.

What I claim as new and desire to protect by Letters Patent of the United States is:

1. An awning for trailers or the like comprising a flat awning member, post means for supporting the outer edge of said awning member above the ground, a pair of identical longitudinally spaced frame members secured to the top of the trailer and extending from side to side thereof, each of said frame members comprising a pair of standards connected by a rod, means for securing said standards to the opposite sides and the roof of the trailer, each of said standards above said rod having inwardly and downwardly extending slots, extension means on opposite sides of said awning member at both ends thereof adapted to ride within said slots, releasable fastening means securing said extensions within said slots, said awning member comprising a flat rectangular sheet provided around its periphery with depending flanges formed at substantially right angles thereto, the side flanges having longitudinally aligned openings at opposite ends, one of said extension means comprising a longitudinal rod having externally threaded ends passing through one pair of said oppositely disposed openings, said externally threaded ends being adapted to be selectively engaged in said inwardly and downwardly extending slots at both ends of said frame members and receiving said fastening means thereon.

2. An awning for trailers or the like according to claim 1, said post means comprising a second rod having internally threaded extensions of less diameter than said rod proper at opposite ends thereof and passing through the other of said aligned openings in said side flanges, a pair of posts adapted to support the side of said awning remote from the trailer having flattened upper ends provided with openings and receiving said internally threaded extensions therethrough on the inner faces of said side flanges, said internally threaded extensions extending outwardly beyond said side flanges and being adapted to be received within the frontmost of said inwardly and downwardly extending slots when the externally threaded ends of said first rod are received withing the other of one of said slots, said fastening means comprising a wing nut having an externally threaded shank adapted to be screwed into said internally threaded extensions whereby to lock the position of said posts relative to said awning member.

3. An awning for trailers or the like according to claim 2, including resilient clips secured to the undersurface of said sheet adjacent the inner faces of the side flanges thereof and adapted to resiliently retain said posts when rotated against said sheet.

References Cited in the file of this patent

UNITED STATES PATENTS

| | | |
|---|---|---|
| 1,752,571 | Olson | Apr. 1, 1930 |
| 2,222,636 | Strauss | Nov. 26, 1940 |
| 2,395,173 | Dobler | Feb. 19, 1946 |
| 2,706,132 | Chaffin | Apr. 12, 1955 |